United States Patent

Oguchi et al.

[11] Patent Number: 6,166,641
[45] Date of Patent: Dec. 26, 2000

[54] TERMITE SENSOR AND TERMITE INTRUSION DETECTING SYSTEM

[75] Inventors: Toshihiko Oguchi, Kawaguchi; Fumio Nakaya, Narashino; Masao Shimada, Tokyo, all of Japan

[73] Assignees: Toshiba Chemical Corporation, Tokyo; Ikari Corporation, Narashino, both of Japan

[21] Appl. No.: 09/380,602

[22] PCT Filed: Mar. 13, 1998

[86] PCT No.: PCT/JP98/01055

§ 371 Date: Nov. 29, 1999

§ 102(e) Date: Nov. 29, 1999

[30] Foreign Application Priority Data

Mar. 14, 1997 [JP] Japan ................................ 9-061469

[51] Int. Cl.[7] .................................................. G08B 23/00
[52] U.S. Cl. .......................... 340/573.1; 340/870.16; 340/652; 340/660
[58] Field of Search ........................ 340/573.1, 870.16, 340/652, 660; 73/587; 43/124

[56] References Cited

U.S. PATENT DOCUMENTS

| | | | |
|---|---|---|---|
| 5,592,774 | 1/1997 | Galyon | 43/124 |
| 5,815,090 | 9/1998 | Su | 340/870.16 |
| 5,877,422 | 3/1999 | Otomo | 73/587 |

FOREIGN PATENT DOCUMENTS

| | | |
|---|---|---|
| 7-115887 | 5/1995 | Japan. |
| 7-24066 | 5/1995 | Japan. |

*Primary Examiner*—Benjamin C. Lee
*Attorney, Agent, or Firm*—Oblon, Spivak, McClelland, Maier & Neustadt, P.C.

[57] ABSTRACT

A termite sensor and intrusion detection system for detecting the intrusion of termites into wooden buildings. Conductive particles fill a container which termites can eat. A pair of electrodes are disposed opposite each other inside the container. A pair of terminals are connected to the electrodes and extend outside the container. Termites are detected by a change of conductivity between the electrodes, when termites are detected a warning device generates a warning signal.

12 Claims, 2 Drawing Sheets

TERMITE SENSOR AND TERMITE INTRUSION DETECTING SYSTEM

BACKGROUND OF THE INVENTION

1. Field of the Invention

The present invention relates to a termite sensor and a termite intrusion detecting system for detecting intrusion of termites into wooden buildings and the like.

2. Discussion of the Background

It is well known that wooden buildings and wooden structures suffer severe damage due to eating by termites.

According to their habit, when intruded into a wooden building or a wooden structure, they eat holes in its wood part to make their nests. Therefore, once the termites intruded into a wooden building or the like, its wooden part is damaged severely by their eating in a very short time. Wooden buildings and wooden structures are often collapsed due to eating by termites.

As one conventional method for avoiding such a situation, there is known a method in which an agent is coated on wooden part of a wooden building or a wooden structure to prevent termites from eating.

However, recent trend restricting toxicity tends to prohibit the use and sales of the agent of which effect lasts long, or of which effect and toxicity are strong.

On the contrary, the low persistent and low toxic agent which is outside the restriction requires to increase its coating frequency to attain enough effect, resulting in more time and more labor.

Now, under such a situation where the agent of strong effect should not be employed, it is effective to employ a termite sensor which can detect instantaneously the intrusion of termites together with a weak agent. Even after the effect of the agent decreases, measures can be taken before the wooden building or the wooden structure is eaten much.

Further, since the intrusion of termites can be detected when such a termite sensor is used, measures for exterminating the termites can be taken at the time when detected. Therefore, when termites not yet intruded, the agent of unnecessarily strong toxicity is not required to be employed. Therefore, the use of highly toxic agent is unnecessary and the amount of use of the agent can be reduced, resulting in much advantages from the view point of material and environment safety.

From such view points, various termite sensors have been provided.

One of them is a termite sensor utilizing infra-red light.

This termite sensor consists of an infra-red light emitting part and a probe for detecting infra-red light. It makes use of a principle that, when a termite goes through between the infra-red light emitting part and the detecting probe of infra-red light, the infra-red light is interrupted to make lower output of the detector. In addition, with this termite sensor, since the number of interruptions can be measured, the number of intruded termites can be grasped.

However, this termite sensor using infra-red light may recognize other insects than a termite such as a black ant, or small animals such as a mouse, as a termite.

Further, when dirt or the like is stuck between the infra-red light emitting part and the detecting probe of infra-red light, it may be also wrongly recognized as a termite to induce malfunction. Therefore, in order to prevent this from occurring, the infra-red light path between the infra-red light emitting part and the detecting probe of infra-red light is required to be cleaned periodically, resulting in more labor for maintenance of the termite sensor.

The other form of termite sensor than one using infra-red light is under research, in which a circuit is formed with conductive paint on wood part or the like which are liable to be eaten by termites. When a termite eats a part of wood, the conductive circuit is disconnected to be detected electrically. This type of termite sensor is simple in its structure and is also easy in maintaining.

However, in the sensor, if the circuit of conductive paint remains connected even when a part of wood has been damaged by the termite, thus not being destroyed, destruction continues without being detected of the intrusion of the termite.

Thus, the aforementioned existing termite sensor has problems in reliability of detection and maintenance.

SUMMARY OF THE INVENTION

Therefore, an object of the present invention is to provide a termite sensor and a termite intrusion detecting system in which misread or detection miss is not likely to occur, and maintenance is also easy.

A termite sensor according to a first invention of the present application involves a container of a material which termites can eat, conductive particles filled in the container, a pair of opposite electrodes disposed in the filled conductive particles, and a pair of terminals connected to the respective electrodes and extended outside the container.

A termite sensor according to a first invention of the present application can be placed at a place such as a path of a termite. When a termite eats a hole in this container of the sensor, the conductive particles filled in the container flow outside the container through the hole. As a result, the insides of the container becomes vacant state, that is, the previous conductive state between a pair of electrodes is changed to the insulated one. Therefore, by watching the conductive state between a pair of terminals of the sensor, whether there is a termite or not can be detected. In the present invention, since a container of a material which a termite can eat is adopted, misread due to other insects than a termite can be reduced. Further, in this termite sensor, since the electrodes for detecting the conductive state are disposed in the container, malfunction due to dirt or the like is not likely to occur. Therefore, such a troublesome maintenance as periodical elimination of dirt and the like is not required, and reliability is also high.

A termite intrusion detecting system according to a second invention of the present application involves a termite sensor which is provided with a container of a material which termites can eat, conductive particles filled in the container, a pair of opposite electrodes disposed in the filled conductive particles, and a pair of terminals connected to the respective electrodes and extended outside the container; and a warning device connected to the electrodes of the termite sensor for generating a warning signal when conductivity between the electrodes becomes below a predetermined value.

In the termite intrusion detecting system of the second invention of the present application, since the detection of termites due to the aforementioned termite sensor with excellent detectability can be recognized instantaneously outside the system, measures can be taken soon.

DETAILED DESCRIPTION OF THE PREFERRED EMBODIMENTS

In the following, embodiments for carrying out the present invention will be described with reference to the drawings.

Figure 1:
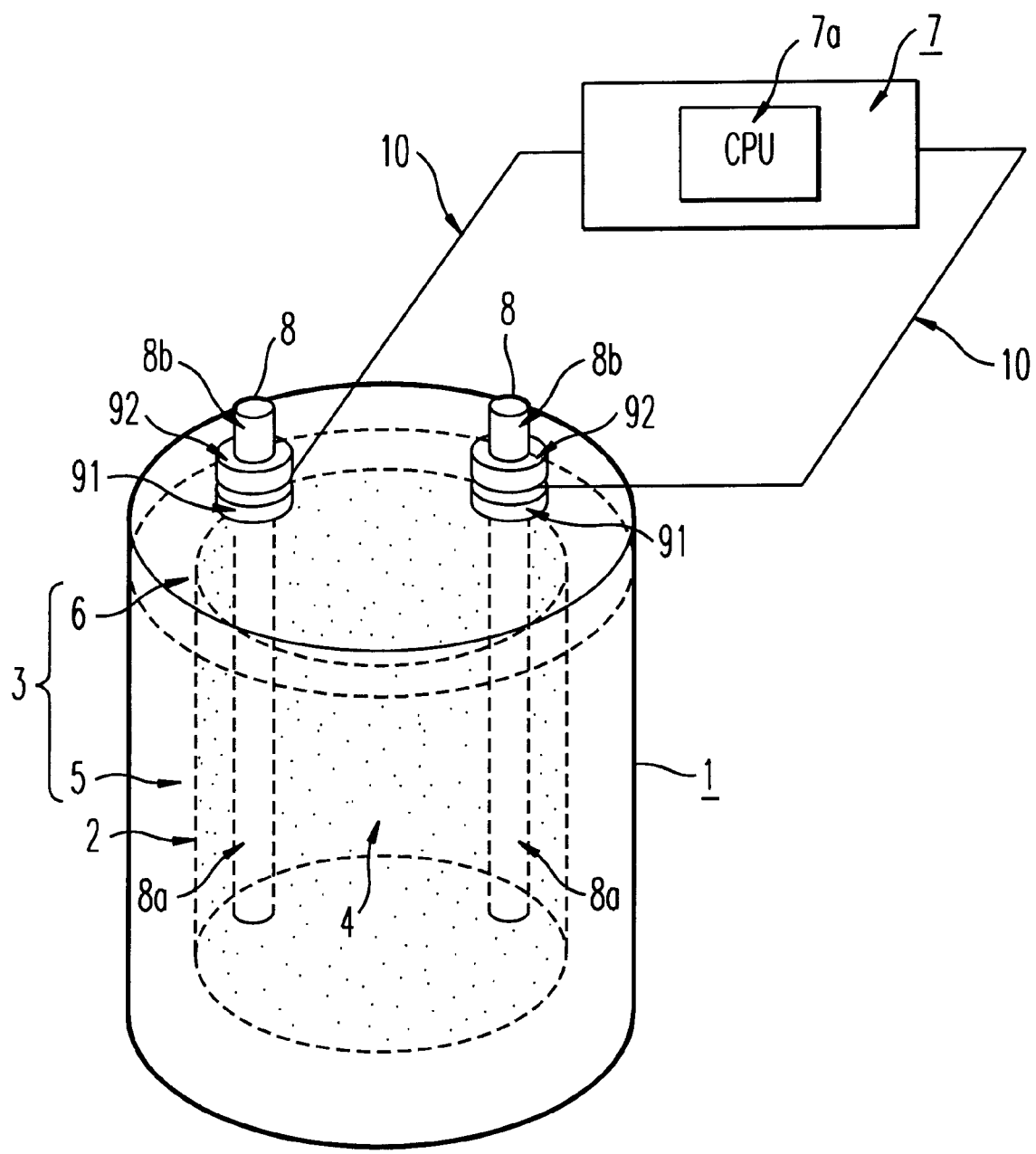
FIG. 1 is a schematic drawing of a termite sensor of the present invention and an example of a termite intrusion detecting system using thereof.

FIG. 1 a schematic drawing of one embodiment of a termite intrusion detecting system of the present invention.

As shown in the figure, the termite intrusion detecting system has a termite sensor 1 and a warning device 7.

The termite sensor 1 has a container 3 inside which conductive particles 4 are filled.

The container 3 consists of a container body 5 and a cover 6, both of which are composed of wood of the same kind. Incidentally, the container body 5 and the cover 6 may be composed of different wooden materials. Further, only the container body 5 may be composed of wooden material, and a cover 6 may be composed of other material such as plastic (required to be insulating material).

The container body 5 is cylindrical with a bottom portion and has even thickness throughout whole body.

The thickness of the container body 5, for instance, when employing such wood as of this example, is preferable to be in the range of from 1 to 20 mm. When the thickness exceeds 20 mm, too much time is required for termites to eat a hole in the container 3 and the detection of termites intrusion is too much delayed. In addition, when the thickness exceeds 20 mm, the termite sensor itself may become too large, affecting its handling and causing restriction upon place to be disposed.

On the contrary, when the thickness is less than 1 mm, the strength of the container 3 deteriorates and producing the container 3 becomes difficult. Further, the termite sensor 1 itself may collapse, or moisture permeated through the wood part of the container 3 may condense on the filled conductive particles 4, causing aggregation or blocking.

The cover 6 has a shape of disc of the same outside diameter as the container body 5 and is formed with about the same thickness as the container body 5. This cover 6 is formed with two holes. Bar members 8, 8 consisting of good conductor such as metal are inserted into the holes. The bar members 8, 8 have respective electrodes 8a, 8a which make contact with the conductive particles 4 in the container 3 and terminals 8b, 8b which are extended outside the container 3.

Inside the container 3, these paired electrodes 8a, 8a are disposed opposite each other. For these electrodes 8a, 8a, it is important that the state of the surface, the electric resistance, or the shape do not change with humidity or atmosphere.

Each of the terminals 8b, 8b is formed with a male screw on the outer surface thereof, which is like a bolt. Two nut-like electrode holders 91, 92 having female screws cut respectively are driven to the portions of the male screws respectively. The electrode holders 91 on the cover 6 side are secured to the cover 6 by adhesive so as to fill gaps therebetween and also the cover 6 is secured to the container body 5 by adhesive so as to fill gaps therebetween, whereby the container 3 is kept airtight.

Lead wires 10 are interposed between the electrode holders 91, 92 to be connected to the terminals 8b, 8b, by winding the ends of the lead wires between the electrode holders 91, 92 attached to respective terminals 8b, 8b and fastening respective upper holders 92 downward.

As the conductive particles 4 to be filled in the container 3, for instance, particles of conductive carbon black with spherical outside shape can be employed. The particle diameter is preferable to be in the range of 0.01 to 2.0 mm. When the particle diameter is larger than 2.0 mm, since a termite requires more time to eat a hole larger than the conductive particles 4 in the container 3, the interval between the intrusion of the termite and the detection by the termite sensor 1 may be too long. In addition, since conductive state is obtained at contact points between particles, when particles of larger particle diameter are employed, few contact points are formed between the electrodes. Therefore, from the view-point of securing conductivity, there may occur lowering of reliability.

On the contrary, when the particle diameter is less than 0.01 mm, fluidity of the conductive particles 4 is damaged. Even if the termites ate holes in the container 3, the conductive particles 4 could not flow out soon, and thus the termite sensor tends to be deteriorated in its detective function. Further, as the particle diameter becomes small, moisture or the like affects on them to cause blocking easily. Even after the holes are eaten in the container 3, conductive state is maintained between the electrodes 8a, 8a. Thus the reliability of the sensor is likely to be decreased.

Further, the conductive particles 4 is preferable to have a volume resistivity of $10^6$ $\Omega.cm^3$ or less when measured in a standing still state, and more preferable to be 50 k$\Omega.cm^3$ or less. When the volume resistivity of the conductive particles 4 is $10^6$ $\Omega.cm^3$ or more, since the resistance between the electrodes 8a, 8a in a closed state is not very different from that in a open state, allowance upon designing detection circuit is limited and thus it will be difficult to secure reliability. When the volume resistivity is made 50 k$\Omega.cm^3$ or less, since enough allowance can be obtained in designing the detection circuit, a sensor of higher reliability can be obtained.

If the conductive particles 4 were oxidized due to atmosphere, electrical resistance would increases rapidly to produce a situation as if circuit became open. Further, when the conductive particles 4 absorb moisture to induce blocking, the electrodes are not in the open state even after the destruction of the container 3. These remarkably decrease reliability of the termite sensor 1. Accordingly it is important that consideration on moisture resistance and environment resistance of the conductive particles 4 is paid for the selection.

As a circuit to be used in a warning device 7 which generates a warning signal when conductivity between the electrodes becomes below a predetermined value through detection of change of conductivity between the electrodes 8a, 8a, Darlinton circuit may be adopted. The respective terminals 8b, 8b and the warning device 7 are connected mechanically and electrically with lead wires 10, 10.

The aforementioned termite sensor 1 is attached to a fixed frame (not shown) made of plastic or the like, and that is placed under the first floor of a house, or at a selected place where humidity is high and termites seem to go around frequently.

In the following, it will be described how the aforementioned termite sensor operates.

The aforementioned termite sensor is placed at an under-floor portion of a pillar consisting of a rectangular lumber being structural member of an wooden building, where termites could come in.

Now, let us consider a case where termites come in a wooden building from outside, starting to eat the portion of the pillar to form a nest.

The intruded termites start eating the portion of the pillar and some of them start eating the wooden container 3 of the termite sensor. After a while, holes are pierced at the degree that the conductive particles 4 can pass through. Then, the filled conductive particles 4 begin flowing out of the container 3 and the number of the conductive particles which forms electrical continuity between the pair of electrodes 8a, 8a of the container 3 decrease to increase electrical resistance rapidly between the electrodes 8a, 8a. In several minutes after forming holes, the electrical resistance between the pair of electrodes 8a, 8a reaches a predetermined value, a CPU (central processing unit) 7a in the warning device 7 which has been detecting the electrical resistance detects the value to be above the predetermined value, resulting in operating the warning device 7.

Thus, according to the termite sensor of the present invention, since a container which termites can eat is adopted, insects other than termites are not likely to be wrongly recognized as termite.

Further, in the termite sensor of the present invention, since such a structure is adopted that the intrusion of termites can be detected the number of the conductive particles contacting the electrodes disposed opposite each other, malfunction due to dirt or the like is not likely to occur. Therefore, frequent maintenance such as periodical elimination of dirt can be unnecessary.

Further, since it has a structure such that the intrusion of termites is not recognized until the conductive particles inside flow out of the container due to eating by termites, malfunction due to sticking of dirt or the like is not likely to occur.

Incidentally, in the aforementioned example, a container of cylindrical external form is employed, however it is not particularly restricted to this. A container of external form of rectangular parallelepiped or cube can be employed. Further, containers made of paper, cellulose fiber, pulp and the like, instead of wood, can be used. Other than these, one which is obtained by impregnating components contained in wood such as resin acid in relatively soft plastic can be used. In essence, due to eating by termites, the conductive particles need only flow out of the inside of the container to the outside.

In attaching a termite sensor to wood which is a structural member of an wooden house, a container of a termite sensor can be directly stuck or fixed with nails or screws to a rectangular lumber or a log instead of using such a fixed frame as in the aforementioned case.

In the case, for instance, the external form of the container can be made in a form which is provided with a plane portion, such as a cylinder or a rectangular parallelepiped, so that the container can be stuck to a plane portion of the building wood, a form which is provided with a part of curved concave so that the container can be stuck to the side of a log, or a form which is provided with both the plane portion and the curved concave portion on different sides respectively so that the container can be stuck to both a rectangular lumber and a log.

Further, a container of which a part is made of a relatively soft material such as pulp or balsa, can be deformed appropriately so that it can be conformed to the form of wood on an intrusion path of termites can be adopted.

Further, at a place which is likely to be an intrusion route of termites of structural members of wooden buildings and wooden structures, a hole for burying a termite sensor can be made and the termite sensor may be disposed therein. In this case, since the termite sensor does not disturb passing of termites, the termite sensor can be attached at a place where termites are likely to wander around.

Further, instead of using a container, a hole bored directly on wood of the part which is likely to be a path of termites among pillars or girders constituting structural members of the wooden buildings and the like can be used as a container. By filling the conductive particles in the hole and by attaching to that a cover to which electrodes are attached, it can be used as a so-called embedded type termite sensor.

An interior form of a container is not restricted to a cylindrical form as described above in particular. It needs only to be a form such that the conductive particles filled inside can flow rapidly when a part of the container is destroyed. However, by disposing a thin portion so that, when termites ate holes, the conductive particles inside the container flow out due to instantaneous destruction of a part of the container, the time elapsed for the conductive particles to flow out after termites begin to eat can be made as short as possible.

As the conductive particles, other than the aforementioned carbon black, metal powder, or particles of synthetic resin or inorganic powder coated with conductive carbon black or metal, can be employed.

As to how to attach the electrodes 8a, 8a, other than the method in the above example in which the pair of electrodes 8a, 8a are placed in parallel with an axis of a cylindrical container 3 through the holes disposed on the cover 6, a method in which two sheets of electrodes are attached perpendicular to an axis direction of the cylinder can be also adopted. In this case, for instance, the inside of the cylindrical container 3 is bored in a cylindrical form, and planar electrodes can be attached to the bottom portion thereof and the upper surface portion opposite thereto, respectively. In this case, when termites ate holes in the container, the conductive particles filled inside flow out. Since the two sheets of electrodes are disposed on the upside and on the downside, when the conductive particles flow out even slightly, electrical continuity between the two sheets of electrodes is lost immediately, and thus the detection is done easily. As a result, the detection capability of the termite sensor can be improved.

Next, embodiments of the present invention will be described.

Embodiment 1

As shown in FIG. 1, in a container body 5 which is made by boring a hole 2 of a diameter of 20 mm and a depth of 20 mm in the center of a piece of beech wood of a diameter of 30 mm and a height of 25 mm, conductive particles 4 of synthetic resin of a diameter of 0.1 mm of which surface was coated with gold were filled. Whereas, after disposing two holes 18 mm apart the distance between their centers on a disc-shape beech wood of a diameter of 30 mm and a thickness of 5 mm to be a cover 6 of the container body 5, bar-like members 8 of metal of 18 mm in length onto which two nut-like electrode holders 91, 92 were engaged each were inserted, and at the same time, the electrode holder 91 was fixed to the cover body 6 with adhesive to fill up the gap. Then, these were set in the container body 5 and the cover 6 was fixed to the container body 5 with adhesive to fill up the gap to produce a termite sensor 1. Further, after winding one end of each lead wire 10 around the bar-like member 8 between the electrode holders 91, 92 of the termite sensor 1, the electrode holder 92 was fastened to connect, and the other end was connected to a warning device 7 which is provided with a CPU 7a for detecting electric resistance between the electrodes 8a, 8a.

In a week after the obtained termite sensor 1 was placed on a path of termites, the termites ate holes in the container 3, the conductive particles 4 therein flowed out, and the electric resistance between the electrodes 8a, 8a became infinity from a initial value of 5 Ω.cm³, resulting in operation of the warning device 7. Incidentally, for all the five sets of the prepared termite sensors, the identical experiments were carried out, it was confirmed that all the warning devices 7 operate in the identical manner.

Embodiment 2

Figure 2A:
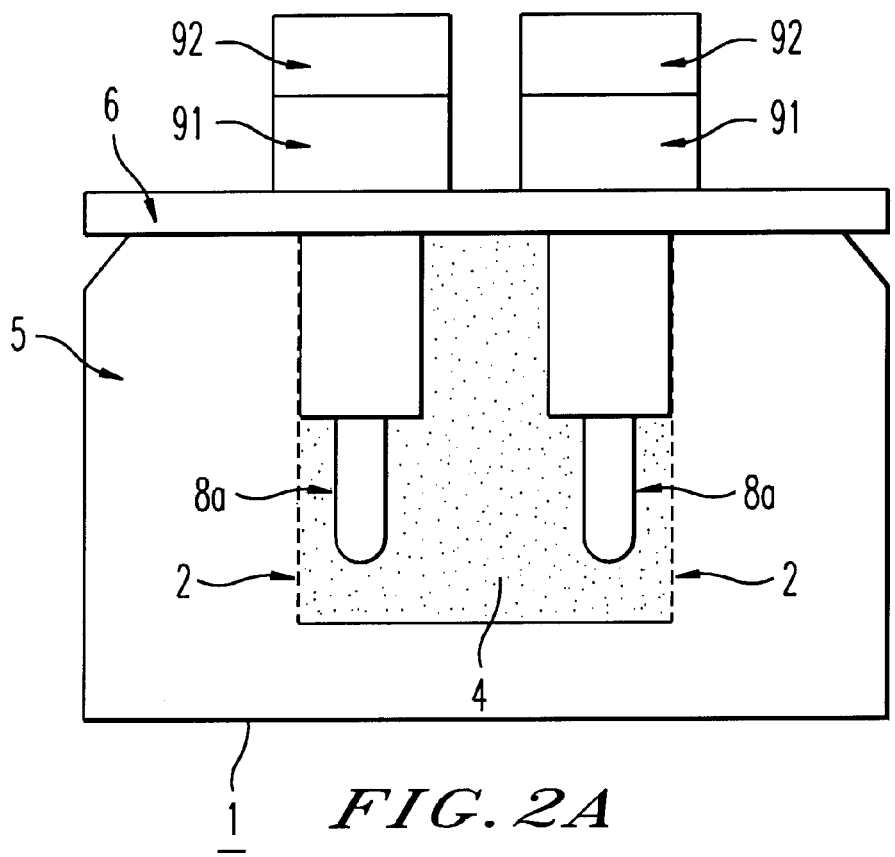
FIG. 2A is a schematic side view of another example of a termite sensor of the present invention.
Figure 2B:
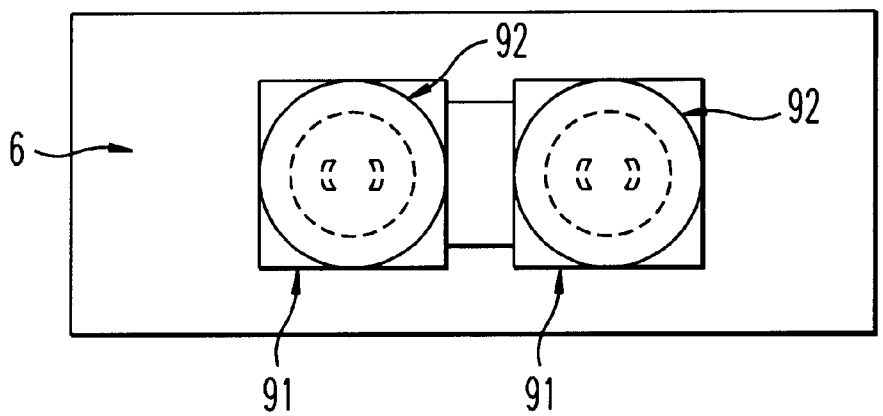
FIG. 2B is a plan view of FIG. 2A.

As a termite sensor 1, one of which form is shown in FIG. 2A (side view) and FIG. 2B (plan view) was produced. Though omitted in the figures, the lead wires were connected to a warning device which is identical as embodiment 1. Incidentally, in these figures, common portions with FIG. 1 were given the reference numbers. That is, in the container body 5 of external form of rectangular parallelepiped, conductive particles 4 of a particle diameter of 300 μm which were obtained by coating conductive carbon black on the surface of the particles of synthetic resin were filled. Further, a pair of golden electrodes 8a, 8a were disposed opposite each other therein, which were held by the electrode holders 91 respectively. The volume resistivity between the electrodes 8a, 8a was 2 kΩ.cm³. The outside of both electrode holders 91, 92 was molded with an insulating material to prevent eating, and the golden electrodes 8a, 8a are also coated with insulating material except their ends. Each lead wire was held between the electrode holders 91, 92.

Within ten days after placing the obtained termite sensor 1 near the path of termites, the container 1 was eaten, the conductive particles 4 therein flowed out, and the electrical resistance between the electrodes 8a, 8a became infinity, resulting in operation of the warning device. All the ten sets of termite sensors 1 produced identically showed the almost similar results.

As described above, the termite sensor according to the present invention detects, precisely in advance, the destruction of wooden portion of wooden buildings or wooden structures by termites. Therefore it can be used effectively as a sensor and a system for protecting the wooden buildings and the wooden structures from eating of termites.

What is claimed is:

1. A termite sensor, comprising:

a container of a material which termites can eat;

conductive particles filled in the container;

a pair of opposite electrodes disposed in the filled conductive particles; and a pair of terminals connected to the respective electrodes and extended outside the container.

2. The termite sensor as set forth in claim 1:

wherein the container which termites can eat is mainly composed of wood.

3. The termite sensor as set forth in claim 2:

wherein thickness of the container is in the range of from 1 to 20 mm.

4. The termite sensor as set forth in claim 2:

wherein the conductive particles are spherical and of 0.01 to 2.0 mm in diameter.

5. The termite sensor as set forth in claim 3:

wherein the conductive particles are spherical and of 0.01 to 2.0 mm in diameter.

6. The termite sensor as set forth in claim 1:

wherein the conductive particles are spherical and of 0.01 to 2.0 mm in diameter.

7. A termite intrusion detecting system, comprising:

a termite sensor comprising a container which termites can eat, conductive particles filled in the container, a pair of opposite electrodes disposed in the filled conductive particles, and a pair of terminals connected to the respective electrodes and extended outside the container; and a warning device connected to the terminals of the termite sensor for generating warning signal when conductivity between the electrodes becomes below a predetermined value.

8. The termite intrusion detecting system as set forth in claim 7:

wherein the container which termite can eat is mainly composed of wood.

9. The termite intrusion detecting system as set forth in claim 8:

wherein thickness of the container is in the range of 1 to 20 mm.

10. The termite intrusion detecting system as set forth in claim 9:

wherein the conductive particles are spherical and of 0.01 to 2.0 mm in diameter.

11. The termite intrusion detecting system as set forth in claim 8:

wherein the conductive particles are spherical and of 0.01 to 2.0 mm in diameter.

12. The termite intrusion detecting system as set forth in claim 5:

wherein the conductive particles are spherical and of 0.01 to 2.0 mm in diameter.

* * * * *